UNITED STATES PATENT OFFICE.

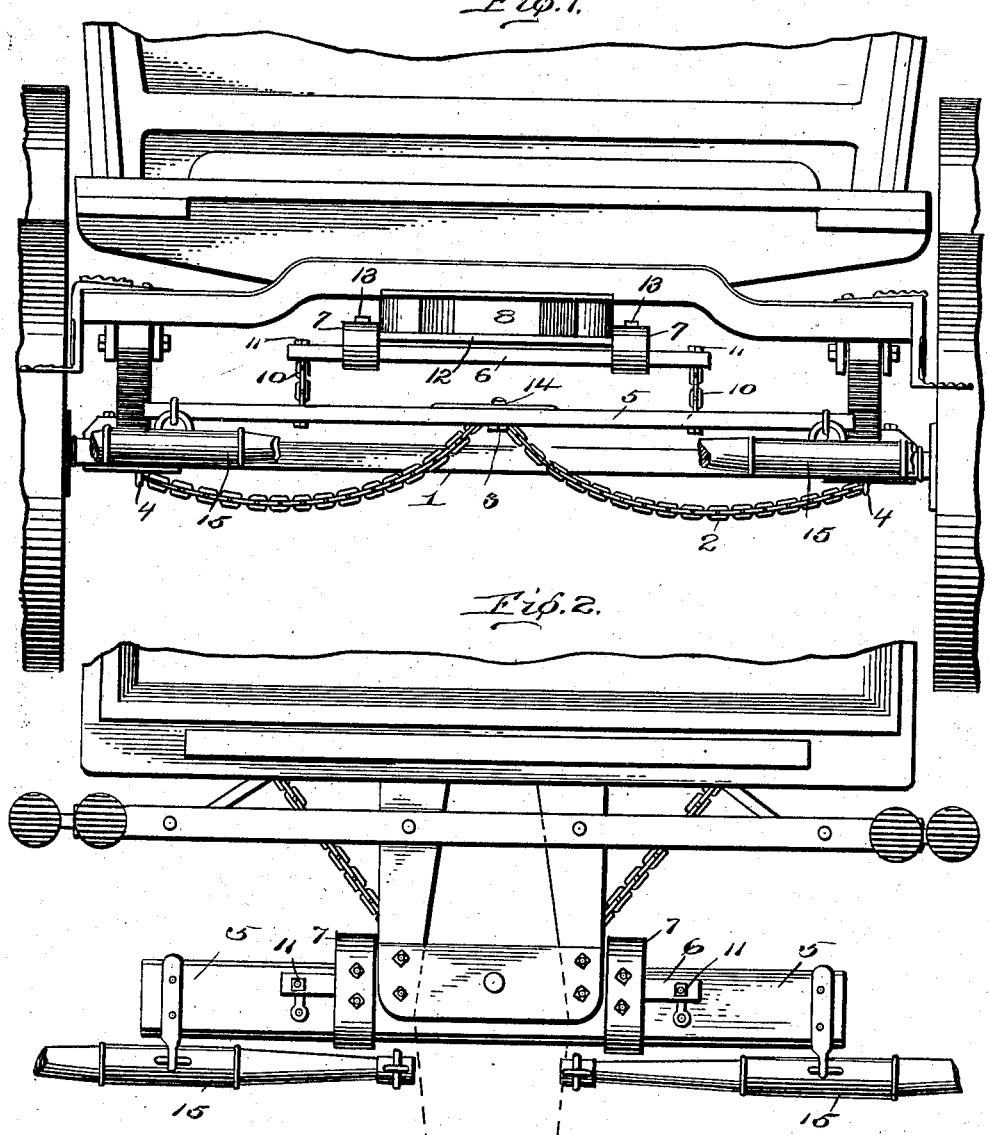

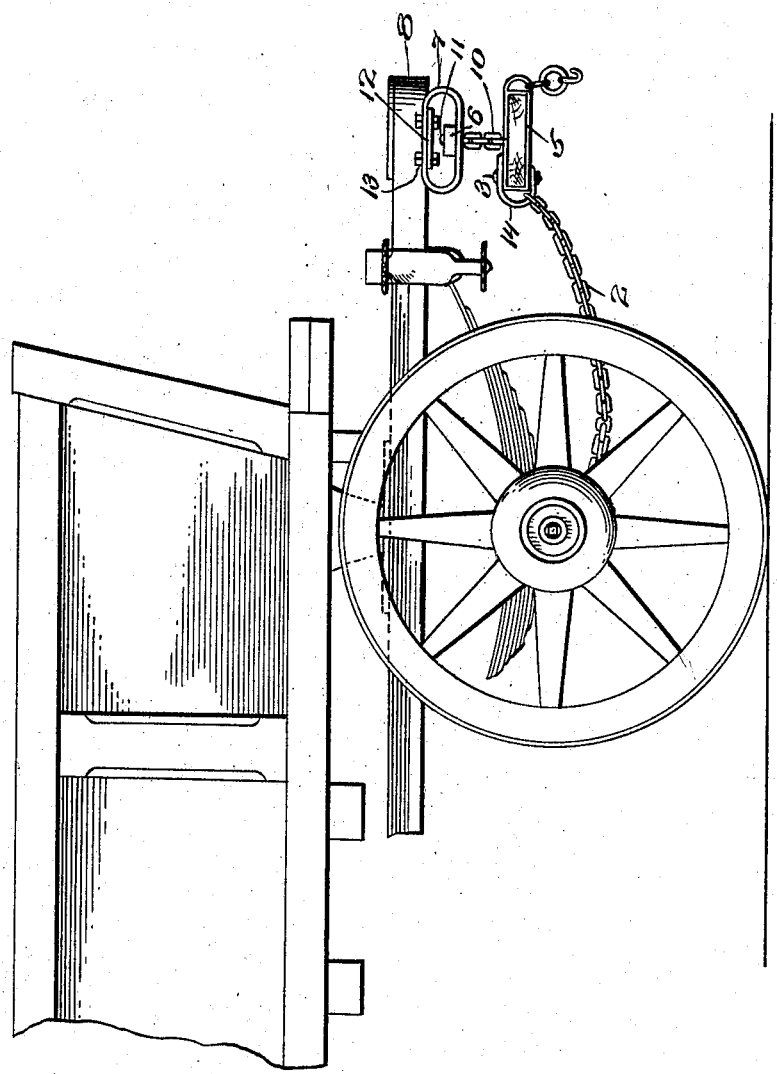

GABRIEL STREICH, OF OSHKOSH, WISCONSIN.

DRAFT ATTACHMENT FOR VEHICLE-GEARS.

No. 923,727.

Specification of Letters Patent.

Patented June 1, 1909.

Application filed April 18, 1908. Serial No. 427,926.

*To all whom it may concern:*

Be it known that I, GABRIEL STREICH, citizen of the United States, residing at Oshkosh, in the county of Winnebago and State of Wisconsin, have invented certain new and useful Improvements in Draft Attachments for Vehicle-Gears, of which the following is a specification.

My invention relates to draft attachments for vehicle gears and is especially adapted to trucks and heavy wagons, and the objects of my invention are to provide a draft approximately upon the axle so that a tongue to the vehicle is not needed, except for backing purposes.

Also an object of my invention is to provide an equalizer to the draft of the vehicle, which shall not require any lubrication, and shall be unaffected by the action of the elements or by mud or other obstructions deposited upon the gear.

A further object of my invention is to provide against a tongue agitation by reason of a twist motion or a side motion of the vehicle wheels.

Another object of my invention is to produce an evener in which chains only, or devices having universal or swivel joints, shall be used on the draft and tension connections, also to produce an evener in which the movement of the parts and connections may be harmonious and smooth and capable of action in harmony with the swaying motion of the team.

My invention is of special importance in pulling the front wheels of a vehicle out of a rut or from street car tracks without side draft or agitation of the tongue, and it provides an evener of the draft upon the axle, the said evener shifting laterally and automatically to keep in the line of draft and to hold the draft directly upon the axle of the vehicle.

I achieve these objects by the device illustrated in the accompanying drawings in which, Figure 1 is a front elevation. Fig. 2 a plan and Fig. 3 a side elevation.

In the drawings 1 represents the axle having draft chains 2—2 secured at opposite ends thereof by worm eye-bolts 4—4, said chains converging to the evener 5 and being attached to the clevis 14 thereof by the clevis pin 3.

8 is a tongue seat and 12 the floor thereof which extends laterally on each side beyond the tongue-seat and is bolted by bolts 13—13 to loops 7—7.

Traveling freely and longitudinally in the loops 7—7 is the evener bar 6, which has attached to it at either end by bolts 11 the tension chains 10—10 supporting the evener 5.

Within the loops 7—7 the evener bar 6 travels longitudinally and laterally in response to any twist motion. The bar 6 extends each side of the loops a proper and sufficient distance to permit of this twist motion or of the side motion to an extent that the opposite draft chain 2 shall become taut. The length of the bar 6, or rather the distance between the points of attachment of its chains, is regulated to these several motions in the construction of my invention. The evener 5 is suspended from the bar 6, as aforesaid, by means of short chains 10—10, which are of a proper length to accord with the side slide, or the twist motion of the bar 6 in relation to the tautness of the draft chains 2—2. Whiffletrees 15 are attached to the evener 5.

My invention provides an equalizer of the draft and affords a draft directly upon the axle.

It will be observed that when any twist motion or side draft is applied to the evener, it will be taken up by bar 6, either in a side motion within the loops, or a twist motion, until the opposite draft chain 2, becomes taut, and then the draft is directly upon the axle.

My improvement is an improvement on the style of evener, in which the evener is suspended by a rigid crank bar, jointed to yield in a certain direction only and allow alternate oscillation of the bar on the rigid loops which suspend the bar, causing friction and noise and a rough movement of the parts.

In my device, I use, in lieu of the crank, a simple sliding evener bar 6 moving in loops 7, and in place of the crank connection of the early device, I use short chains 10—10 to suspend the evener from the sliding evener bar 6. These tension chains 10 act as a universal joint, and in addition to the limited movement allowed by the prior, more or less rigid crank bar, the links of the chain allow movement in all directions, so that the evener may lift at one or the other end to oscillate without lifting the evener bar 6, and consequently friction from this source is reduced. There is also no need of lubrication of the part as the friction is now reduced.

The tension chains co-act with the draft chains, and the evener shifts, more readily and smoothly than the usual crank support will allow.

This draft attachment is readily removable and may be detached by twisting the chains 2—2 from the eye-bolts 4 and unscrewing one of the nuts 11. The bar 6 may then be removed from the loops 7—7 and the whole draft attachment transferred to another vehicle.

What I claim is:—

A draft attachment for vehicle gears comprising a seat with a flooring having its opposite ends projecting beyond the seat, loops bolted to said projecting ends, a bar loosely mounted in said loops and having its opposite ends projecting therefrom, chains secured to said projecting ends of the bar, said chains having a depending evener bar thereon, whiffletrees secured to the opposite ends of the evener bar, said evener bar being also provided with a clevis having a coupling pin inserted therethrough, an axle having the outer ends of chains of the evener bar secured thereto, the inner ends of the chains being secured to said clevis, and said evener bar adapted to have longitudinal and lateral play so as to permit of longitudinal and lateral movement of the bar in the loops, substantially as specified.

In testimony whereof I affix my signature, in presence of two witnesses.

GABRIEL STREICH.

Witnesses:
 ROBERT W. WERTSCH,
 JOHN WOLFF, Jr.